Aug. 2, 1960
R. J. HEUSEL
2,947,167
TEST FIXTURE
Filed May 20, 1957
2 Sheets-Sheet 2
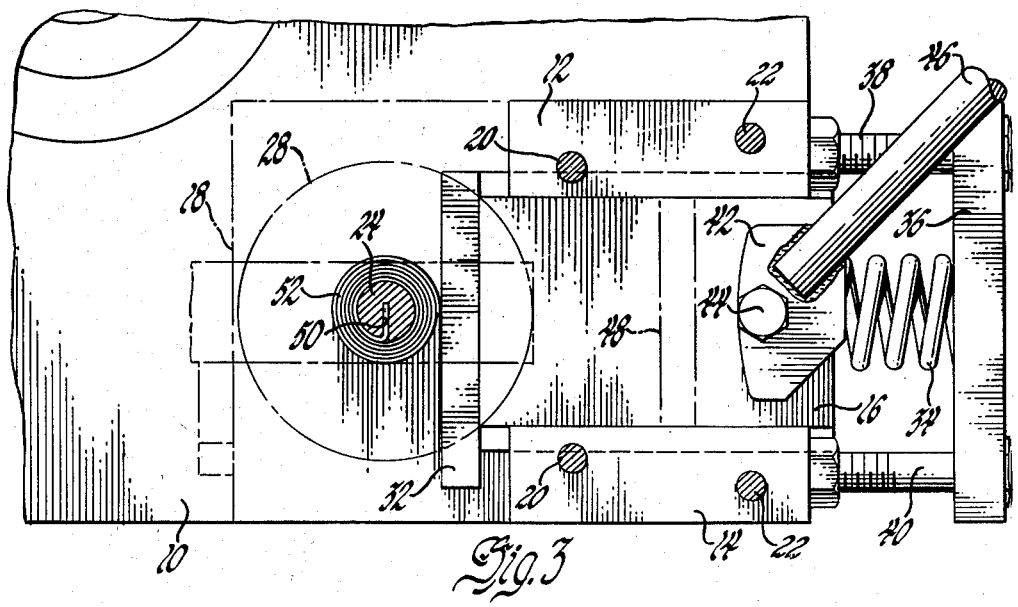
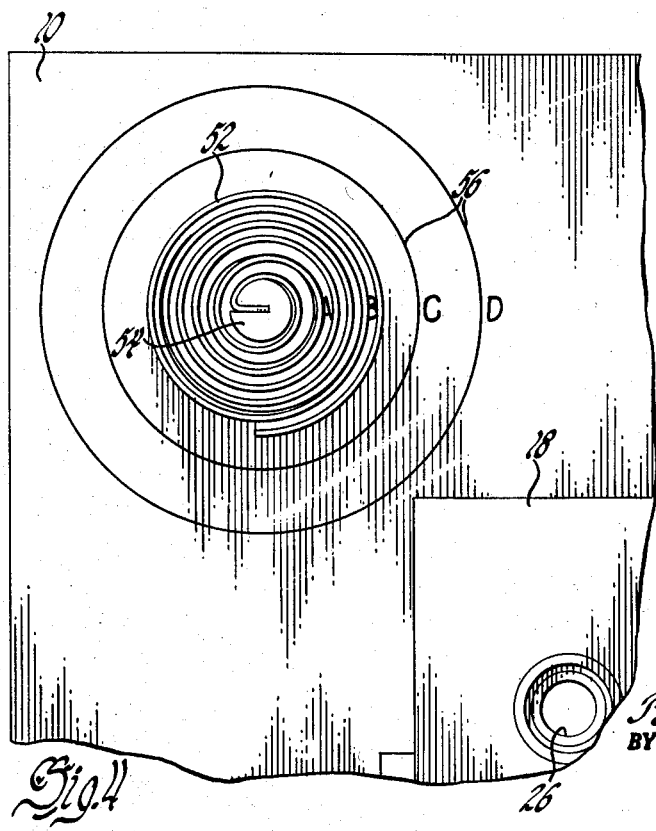
INVENTOR.
Robert J. Heusel
BY
ATTORNEY.

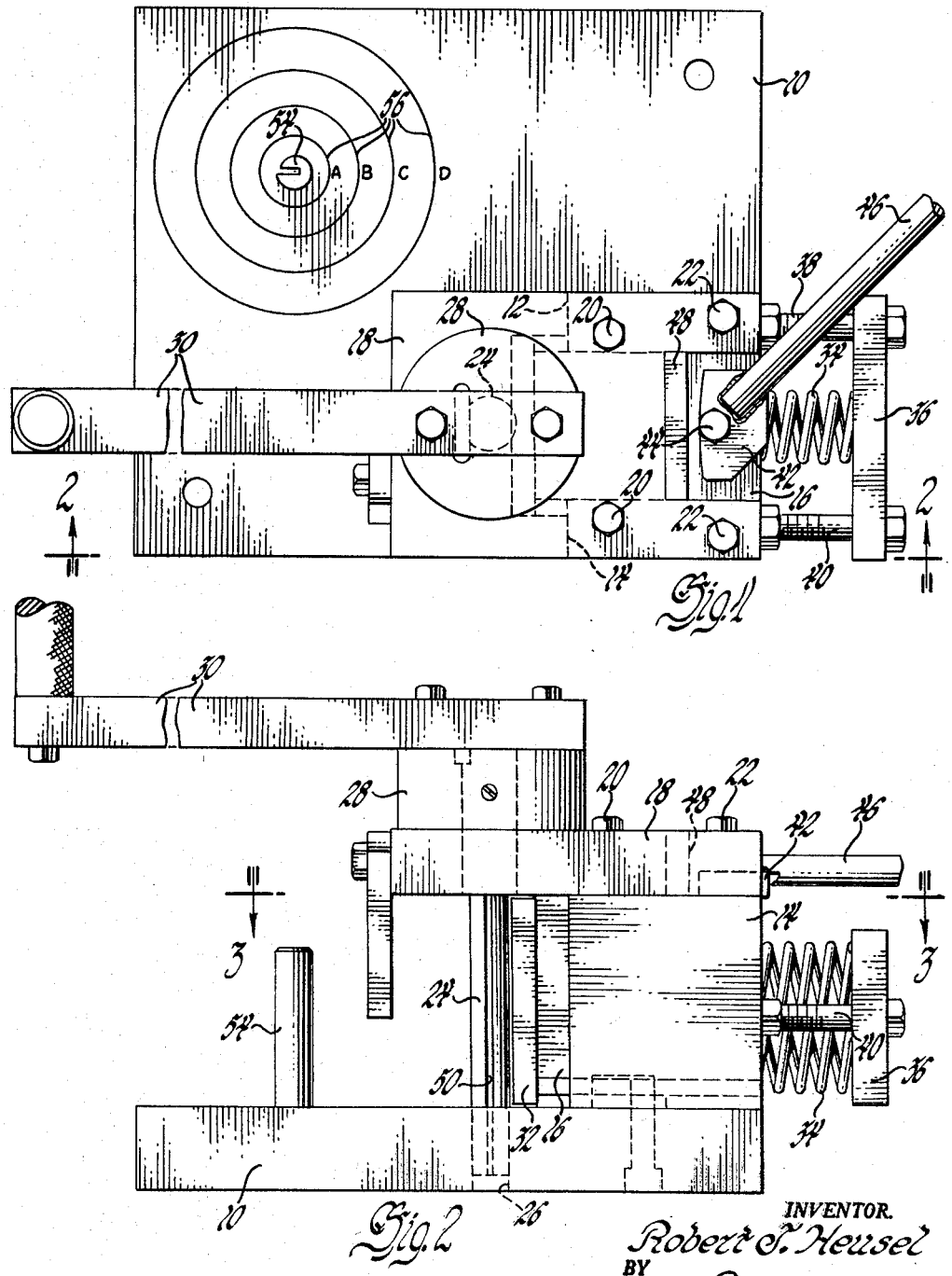

United States Patent Office 2,947,167
Patented Aug. 2, 1960

2,947,167

TEST FIXTURE

Robert J. Heusel, Flint, Mich., assignor to General Motors Corporation, Detroit, Mich., a corporation of Delaware Filed May 20, 1957, Ser. No. 660,161

1 Claim. (Cl. 73—100)

This invention relates to a test for determining the resilient character of a material and particularly the spring-back character of stainless steel metals used in forming rolled or bent moldings for ornamental purposes and the like on automotive vehicles or elsewhere.

In forming ornamental moldings for automotive vehicles and the like, where a large production is involved, it is not uncommon that several different coils of stainless steel will be used in making the required number of molding pieces. In the past, difficulty has been encountered in bending rolled sections from different coils due to the differences in the resilience or, as more commonly known, the spring-back character of the stainless steel material in different coils. Heretofore, coils of sheet stainless steel have been graded according to yield strength. Since spring back is not directly related to yield strength in the cold working of metal, the yield strength grading is not entirely dependable.

It is here proposed to provide a test fixture particularly designed to test the spring-back character of a sample piece of material cut from a coil of the material to be cold worked in the bending and forming of ornamental moldings and the like. The proposed test fixture may be used in any instance in which the spring-back character of the material affects the processing of the parts to be made.

In the drawings:

Figure 1 is a top view of the proposed spring-back test fixture.

Figure 2 is a side view of the test fixture shown in Figure 1 taken in the plane of line 2—2 and viewed in the direction of the arrows thereon.

Figure 3 is a cross section of a part of the test fixture and is taken in the plane of line 3—3 of Figure 2 looking in the direction of the arrows thereon.

Figure 4 is an enlarged fragmentary view of the test fixture showing the calibration means for gauging the spring-back character of a member formed within the proposed test fixture.

One embodiment of a suitable test fixture including the principles of the disclosed invention includes a base member 10 having spaced vertical walls 12 and 14 secured thereto at one end thereof and adapted to receive a slide block 16 therebetween. A cover plate 18 is secured to the side walls, as by bolts 20 and 22, and extends over the ends of side walls. An arbor 24 is rotatably journaled through the cover plate 18 and has its end received within an opening 26 formed in the base member 10. The arbor 24 is keyed to a cylindrical member 28 which provides a collar on the arbor that is received upon the cover plate. A handle 30 is secured to the collar member to enable rotation of the arbor.

A wiping block 32 is secured to the end of the slide block 16 next adjacent the rotatable arbor 24. The slide block and the wiper are biased toward the arbor by a coil spring 34 engaged between the end of the slide block 16 and a stop 36 which is spaced from the block on posts 38 and 40 extended horizontally from the block guiding side walls 12.

The cover plate 18 is cut away at one end to receive a cam 42 rotatably secured to the slide block on a pivot pin 44. A handle or lever 46 is secured to the cam and by means thereof the cam may be rotated to have the end thereof engage the bearing wall 48 of the cover plate to enable backing off the slide block 16 from the arbor 24 against the force of the biasing spring 34.

A slot 50 is formed within the arbor 24 to receive the end of a strip of material, designated by numeral 52 in the drawings, which has been cut to a given length from a larger coil of sheet material that is to be examined.

As the arbor 24 is rotated, counterclockwise in this instance, the strip material 52 is formed into a spiral about the arbor as successive layers thereof are held in engagement with the arbor as it rotates past the wiping block 32. After the strip of material has been wound about the arbor, the cam lever 46 is used to retract the spring biased block 16 and the arbor 24 is withdrawn to enable the coiled strip to be removed.

An upright post 54 is secured to the base member 10 and has a plurality of calibrated rings 56 scribed on the surface of the base member circumferentially about the post. These rings are marked A, B, C, and D and are indicative of acceptable spring-back limits for the material to be tested.

The coiled strip of material 52 in its free and natural state will expand to the extent that its elastic limit has not been exceeded in forming the spiral. The tendency to return to its natural shape is the spring-back character which is to be determined. Consequently, the sample spiral is next disposed upon the upright post 54 which has the calibration rings 56 formed on the base member circumferentially therearound and the distance of the free end of the coil from the post is representative of the spring-back character of the material.

What is claimed is:

A test fixture for measuring the spring-back character of sheet material comprising a base, a supporting structure secured to said base, a rotatable arbor journaled in said supporting structure and in said base and having a slot formed therein for receiving one end of a sample strip of said sheet material, a wiping block slidable in said supporting structure and adjacent one side of said arbor, spring means biasing said wiper block toward said arbor, means for rotating said arbor with said strip of material engaged therewith for forming said material in a spiral about said arbor, said material being wound in successive layers about said arbor and between said arbor and said wiping block, a post secured in said base adjacent said supporting structure, and a plurality of circular calibrations scribed in said base and about said post, said calibrations being adapted to measure the displacement of the outer end of said strip of material with respect to said post when said material is placed on said post and allowed to expand to the natural position thereof.

References Cited in the file of this patent

UNITED STATES PATENTS

| | | |
|---|---|---|
| 2,093,497 | Walker | Sept. 21, 1937 |
| 2,338,202 | Reading | Jan. 4, 1944 |

FOREIGN PATENTS

| | | |
|---|---|---|
| 679,189 | Germany | July 31, 1939 |